July 5, 1960
N. K. WALKER
2,944,214
APPARATUS FOR DETECTING RATE OF CHANGE OF
ANGULAR ATTITUDE OF A BODY
Filed June 4, 1958
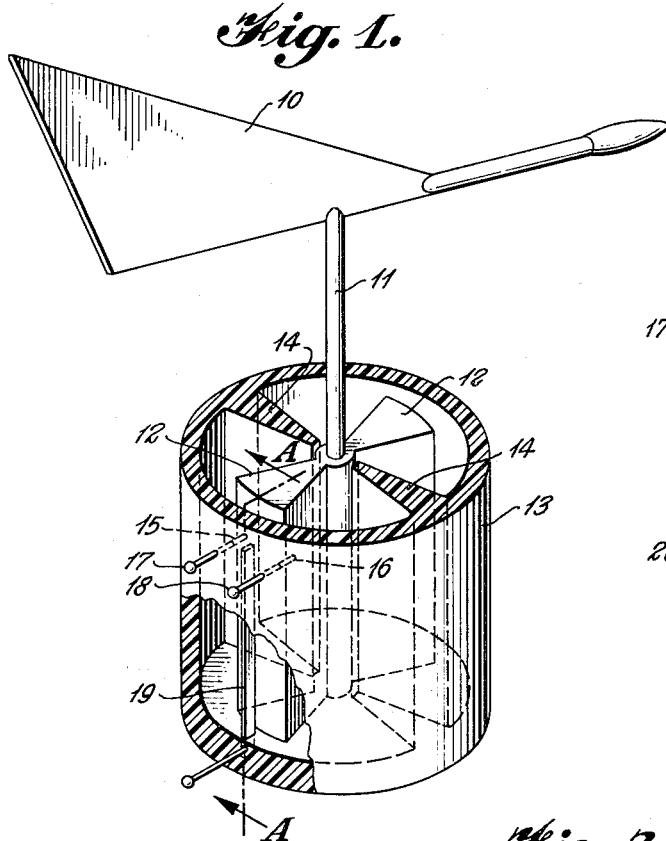
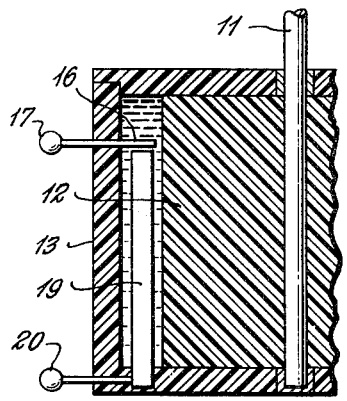
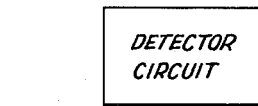
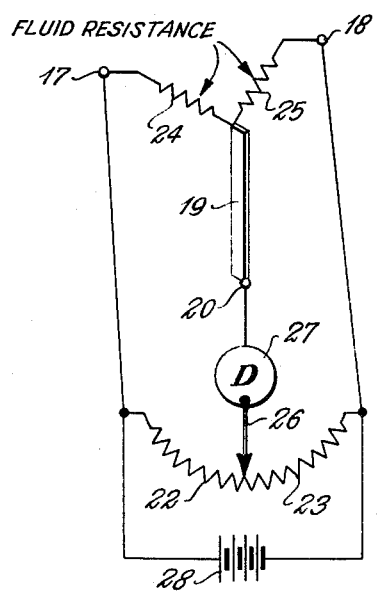
INVENTOR
Norman K. Walker
BY Sughrue & Rothwell
ATTORNEYS United States Patent Office 2,944,214
Patented July 5, 1960

2,944,214
APPARATUS FOR DETECTING RATE OF CHANGE OF ANGULAR ATTITUDE OF A BODY

Norman K. Walker, Kensington, Md., assignor to Advanced Research Associates, Incorporated, Kensington, Md.

Filed June 4, 1958, Ser. No. 739,908

9 Claims. (Cl. 324—70)

This invention relates to apparatus for detecting rate of change of angular attitude of a body and to provide an electrical signal proportionate to said rate and more particularly to apparatus for sensing the velocity of flow of a fluid as determined by said rate and providing an electrical signal which is a function of said velocity and therefore is a function of said rate.

Servosystems commonly are used to control the attitude of heavier-than-air craft such as airplanes and helicopters. This includes control of the slip of the craft—the angular difference between its compass heading and its line of flight with relation to the air. In such systems it is important that a signal be supplied thereto which is a function of the rate of slip. It has often been the case in the past to construct such apparatus in a manner so as to provide a plurality of mechanical parts which operate in an electrical system by moving in physical contact with one another to provide the control function. Such apparatus provides a signal which itself is not indicative of rate but which must be differentiated to provide a rate function. Apparatus of this kind is both unreliable and costly to construct and maintain.

It is therefore an object of this invention to provide apparatus for detecting angular rate which provides a signal which itself is a rate function and necessitates no differentiating circuitry.

It is another object of this invention to provide apparatus for detecting angular rate which includes no mechanical parts whose physical contact position with relation to each other determines the nature of the output signal.

These and other objects of the invention will become apparent from a detailed description of the accompanying drawings.

In the drawings:

Figure 1 is an isometric view partly fragmentary of one form of apparatus which may be used in this invention and, Figure 2 is a fragmentary vertical section of the apparatus of Figure 1 taken along line A—A thereof and, Figure 3 is a horizontal cross-sectional view of the apparatus of Figure 1 also including the electrical detecting means in diagrammatic form and, Figure 4 is a circuit diagram showing a form of detecting means that may be used in connection with this invention.

For illustration purposes we shall describe this invention as it finds application in detecting the slip rate of an aircraft. The invention is of course not so limited but finds broad utility in any system wherein an angular rate system is required. Referring to the drawings, numeral 10 indicates a vane over which the airstream passes. The vane will position itself approximately along the line of flight to the aircraft, and the angle between the vane and the aircraft centre line will be equal to the angle of slip. If the angle should change the vane will rotate relative to the aircraft with a rotational velocity which is proportionate to the slip rate. The shaft 11 to which the vane 10 is mounted will rotate to drive a paddle member 12 in a rotary direction within the housing 13. The housing 13, fixed to the moving body (not shown), is provided with baffle members 14 which extend inwardly toward the center of the housing and the center of rotation of the paddles. The entire housing is filled with a fluid which has a degree of electrical conductivity. Such a fluid may be an organic alcohol with a small trace of an inorganic salt therein. Outer electrodes 15 and 16 are mounted in the housing and extend into the fluid. Electrode contacts 17 and 18 are provided on the outer ends of these electrodes. A central electrode 19 is positioned between the outer electrodes 15 and 16 and is provided with a contact 20 which is electrically connected through the wall of the housing to the electrode 19. This central electrode 19 is preferably constructed of a thin sheet of current conducting material such as metal which is inert to the fluid. Electrodes 15 and 16 also may be metallic and inert to said fluid. The paddle members may be plastic, non-conductive and inert to the fluid. The housing may also be plastic, non-conducting, and inert to the fluid.

The central electrode 19 is preferably mounted at one end 21 to the base of the housing 13 and is flexible and resilient in the direction of movement of the fluid as determined by the paddles 12. It can be seen that as the paddles rotate in response to a movement of the vane 10, the paddles will pump the fluid in the housing in a rotary direction over the central electrode 19 from one compartment defined by the baffles to the next compartment. The fluid velocity will be proportionate to the angular velocity of the vane driving the paddles. This angular velocity of the vane is proportionate to the slip rate. Therefore the velocity of the fluid will be proportionate to the slip rate. As the fluid passes over the central electrode 19 it will flex in a direction determined by the direction of movement of the fluid and in an amount proportionate to the velocity of the fluid. As the velocity decreases, indicating a decrease of slip rate, the amount of flex will also decrease. Should the slip rate decrease to zero the central electrode 19 will again be centrally positioned between the electrodes 15 and 16.

A bridge comprised of resistors 22, 23, 24 and 25 is employed to measure the amount of deflection of the central electrode 19. Resistor 24 constitutes the resistance of the fluid between electrode 15 and electrode 19. Resistor 25 constitutes the fluid between electrode 16 and electrode 19. As the electrode 19 flexes as a function of the fluid velocity resistors 24 and 25 will change since they are a function of the distance traversed by the current flowing through the fluid between electrodes 15 and 16 and electrode 19. A wiper arm 26 adjusts the current in the central branch of the bridge including detector 27 and electrode 19 to zero when the fluid in the housing is stationary. As the electrode 19 flexes, for example to the right as shown in these figures, resistor 24 will increase and resistor 25 will decrease. This upsets the balance of the bridge which is supplied with current by the battery 28, to provide a resultant current in the central branch. An A.C. source may be used. The amplitude of said current in the central branch at any time is proportionate to the magnitude of the deflection of the electrode 19 from its central position and consequently said amplitude is proportionate to the slip rate. The detector 27, which may be of a conventional variety, detects the signal developed in the central branch and may feed said signal to an indicator or to a servosystem for controlling the slip of the aircraft.

Although this invention has been illustrated with apparatus employing baffles extending into the housing, such need not be the case. The baffles serve to make the system more sensitive and accurate. However a housing without baffles may be employed. Additionally only one paddle is actually necessary to make the apparatus function properly.

What has been disclosed and described is one embodiment of the present invention. Other embodiments obvious to those skilled in the art from the teachings herein are contemplated to be within the spirit and scope of the following claims.

What is claimed is:

1. Apparatus for detecting rate of change of angular attitude of a body and for providing an electrical signal proportionate to said rate that comprises; mechanical means to sense said rate, a housing for housing a conductive fluid, means operatively connected to said mechanical means to pump said fluid in a path of movement in said housing at a velocity proportionate to said rate, a first electrode positioned in said path of movement, said electrode being resilient and flexible in the direction of said movement, second and third electrodes positioned in said path on opposite sides of said first electrode and means to detect the fluid resistance between said electrodes as a function of said fluid velocity to provide said electrical signal.

2. Apparatus as defined by claim 1 wherein said detecting means includes a bridge network, one arm of said bridge being said fluid resistance between said first and second electrodes and another arm of said bridge being said fluid resistance between said first and third elcetrodes.

3. Apparatus as defined by claim 1 wherein said electrodes are carried by said housing and said second and third electrodes are adjacent to said first electrode and positioned in alignment with said first electrode substantially longitudinally of the direction of movement of said fluid.

4. Apparatus as defined by claim 1 further including means carried by said housing to constrict the flow of said fluid in said path of movement.

5. Apparatus as defined by claim 1 wherein said pumping means includes at least one paddle member and means to rotatably mount said paddle member in said housing and wherein said housing is substantially circular in cross-section, said paddle member extending outwardly from the center of said cross-section toward the periphery thereof and having a radius approaching the radius of said cross-section.

6. Apparatus for detecting rate of change of angular attitude of a body and for providing an electrical signal proportionate to said rate that comprises; mechanical means to sense said rate, a housing for housing a conductive fluid, means operatively connected to said mechanical means to pump said fluid in a path of movement in said housing at a velocity proportionate to said rate, a first electrode positioned in said path of movement, said electrode being resilient and flexible in the direction of said movement, at least a second electrode positioned in said path and means to detect the fluid resistance between said electrodes as a function of said fluid velocity to provide said electrical signal.

7. Apparatus for detecting rate of change of angular attitude of a body and for providing an electrical signal proportionate to said rate that comprises; means to sense said rate, a housing for housing a conductive fluid, means operatively connected to said sensing means to pump said fluid in a path of movement in said housing at a velocity proportionate to said rate, a first electrode positioned in said path of movement, said electrode being resilient and flexible in the direction of said movement, at least a second electrode positioned in said path and means to detect the fluid resistance between said electrodes as a function of said fluid velocity to provide said electrical signal.

8. Apparatus as claimed in claim 6 wherein said second electrode is positioned stationary in said path of movement.

9. Apparatus for detecting the rate of change of a physical phenomenon and for providing an electrical signal proportionate to said rate that comprises; means to sense said rate, a housing for housing a conductive fluid, fluid pumping means operatively connected to said sensing means to pump said fluid in a path of movement in said housing at a velocity proportionate to said rate, a first electrode positioned in said path of movement, said first electrode being resilient and flexible in the direction of said movement, at least a second electrode coupled by said fluid to said first electrode and means to detect the fluid resistance between said electrodes as a function of said fluid velocity to provide said electrical signal.

References Cited in the file of this patent

UNITED STATES PATENTS

| | | |
|---|---|---|
| 2,155,419 | Gunn | Apr. 25, 1939 |
| 2,255,771 | Golay | Sept. 16, 1941 |
| 2,665,896 | Kirby | Jan. 12, 1954 |
| 2,729,893 | Bartelink | Dec. 27, 1955 |